US012617613B1

(12) United States Patent
Bray et al.

(10) Patent No.: US 12,617,613 B1
(45) Date of Patent: May 5, 2026

(54) SYSTEMS AND METHODS FOR A HIGH THROUGHPUT SORTATION SYSTEM

(71) Applicant: Amazon Technologies, Inc., Seattle, WA (US)

(72) Inventors: Michael Alan Bray, Elkhorn, NE (US); Ganesh Krishnamoorthy, Seattle, WA (US); Vivek S. Narayanan, Franklin, TN (US); Max Alfonso Bruccoleri, Lake Forest Park, WA (US)

(73) Assignee: Amazon Technologies, Inc., Seattle, WA (US)

( * ) Notice: Subject to any disclaimer, the term of this patent is extended or adjusted under 35 U.S.C. 154(b) by 397 days.

(21) Appl. No.: 18/341,594

(22) Filed: Jun. 26, 2023

(51) Int. Cl.
　*B65G 1/06*　　(2006.01)
　*B65G 1/137*　　(2006.01)

(52) U.S. Cl.
　CPC ........... *B65G 1/065* (2013.01); *B65G 1/1378* (2013.01)

(58) Field of Classification Search
　CPC .............................. B65G 1/065; B65G 1/1378
　See application file for complete search history.

(56) References Cited

U.S. PATENT DOCUMENTS

| | | | |
|---|---|---|---|
| 2022/0230229 A1* | 7/2022 | Schubilske | G06Q 10/0875 |
| 2022/0289479 A1* | 9/2022 | Traina | B65G 1/0492 |
| 2022/0332507 A1* | 10/2022 | Boer | B65G 1/0464 |
| 2023/0264899 A1* | 8/2023 | Hinojosa | B65G 1/1378 700/218 |
| 2024/0328699 A1* | 10/2024 | Fankhauser | B65G 1/0492 |

FOREIGN PATENT DOCUMENTS

| | | | | |
|---|---|---|---|---|
| WO | WO-2018185231 A1 * | 10/2018 | | B65G 1/065 |
| WO | WO-2021223885 A1 * | 11/2021 | | B65G 1/1378 |
| WO | WO-2022213131 A1 * | 10/2022 | | G06Q 10/087 |
| WO | WO-2024114890 A1 * | 6/2024 | | B65G 37/02 |

* cited by examiner

*Primary Examiner* — Garcia Ade
(74) *Attorney, Agent, or Firm* — Eversheds Sutherland (US) LLP

(57) ABSTRACT

Systems and methods are disclosed for a shuttle track system for efficiently sorting items and packages by increasing a throughput of shuttles loaded with items. To increase item shuttle throughput, a shuttle track designated for shuttles that transport items (e.g., item track) may be positioned between on either side of a tote track designed for shuttles that transport totes (e.g., tote tracks). Tote receiving areas which may support totes for receiving the items may be positioned between each item track and the tote track. Shuttles designed to transport items (e.g., item shuttles) may deliver items to the totes in the tote receiving areas via the item tracks and shuttles designed to retrieve and/or receive totes (e.g., tote shuttles) may retrieve and/or receive totes via the tote track. Multiple sortation levels may be stacked and interconnected via ramps and/or shuttle lift systems to maximize and/or optimize item shuttle throughput.

20 Claims, 9 Drawing Sheets

900 ⟶

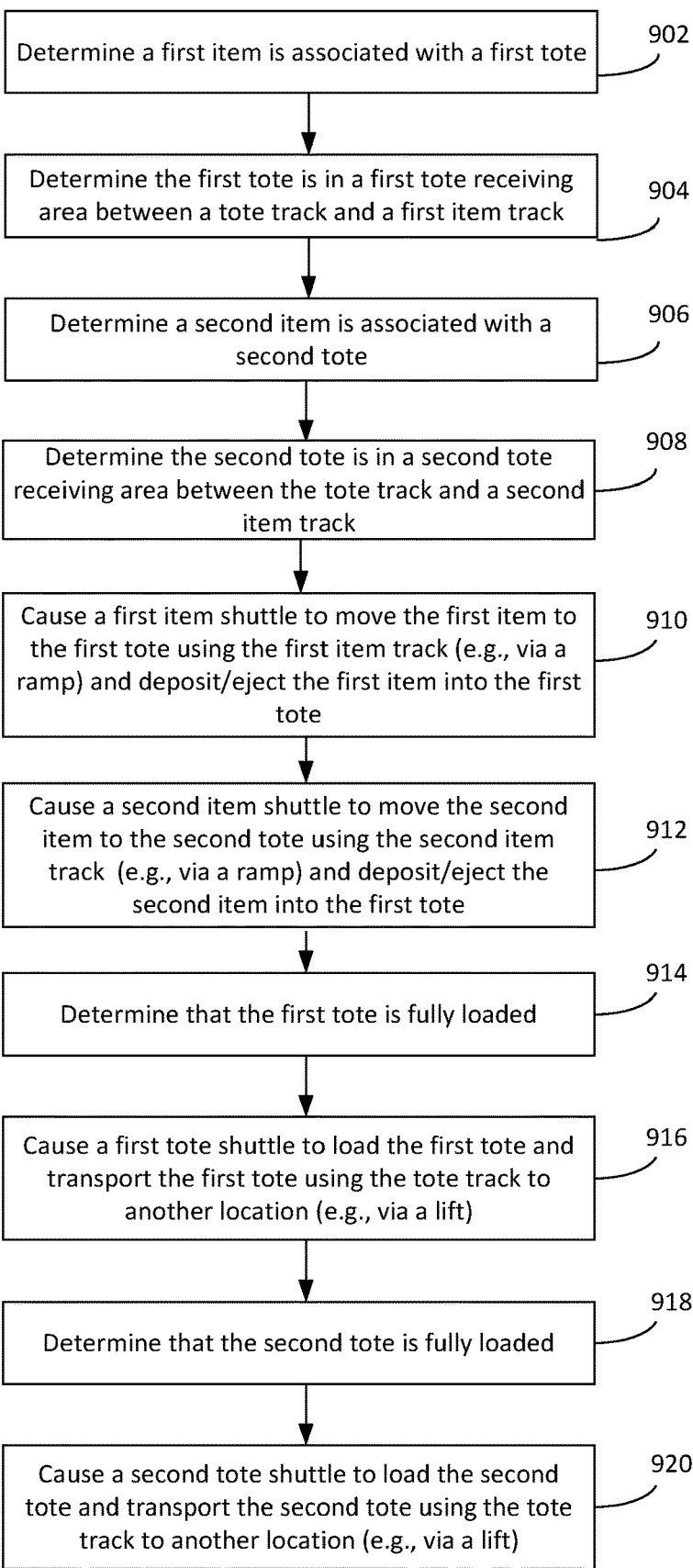

Determine a first item is associated with a first tote    902

Determine the first tote is in a first tote receiving area between a tote track and a first item track    904

Determine a second item is associated with a second tote    906

Determine the second tote is in a second tote receiving area between the tote track and a second item track    908

Cause a first item shuttle to move the first item to the first tote using the first item track (e.g., via a ramp) and deposit/eject the first item into the first tote    910

Cause a second item shuttle to move the second item to the second tote using the second item track (e.g., via a ramp) and deposit/eject the second item into the first tote    912

Determine that the first tote is fully loaded    914

Cause a first tote shuttle to load the first tote and transport the first tote using the tote track to another location (e.g., via a lift)    916

Determine that the second tote is fully loaded    918

Cause a second tote shuttle to load the second tote and transport the second tote using the tote track to another location (e.g., via a lift)    920

FIG. 9

SYSTEMS AND METHODS FOR A HIGH THROUGHPUT SORTATION SYSTEM

BACKGROUND

As users increasingly make online purchases, fulfillment of such purchases become increasingly complicated. For example, a fulfillment center may have output of upwards of one million packages per day. With such demands, efficiency of logistics related to processing orders and distributing packages is of high importance. To achieve efficient distribution and sortation and ultimately fulfillment of such orders, often various conveyor, roller, chute, and/or shuttle systems are used throughout a fulfillment center to distribute items and/or packages.

Recently, shuttles have been used move items and packages throughout such fulfillment centers. For example, shuttles have been used to perform sortation of packages and other items in the fulfillment centers. Shuttles may carry packages between locations in such centers and may deposit packages at desired area. Given the large volume of packages and other items that need to be sorted and ultimately delivered, a high volume of shuttles and a complex shuttle track are required.

Current systems, such as shuttle track system 100 of FIG. 1, may involve a number of item tracks (e.g., item tracks 102) that guide shuttles holding items to a tote (e.g., tote 104) in tote receiving areas (e.g., tote receiving area 106). A tote track (e.g., tote track 108) may extend adjacent to such tote receiving area for loading loaded totes onto shuttles (e.g., shuttle 105) on the tote track. Other arrangements may also be used such as multiple tote tracks for loading totes. However, optimization challenges arise due to a difference in throughput between the item track and tote track due the number of shuttles it takes to load a single tote. Accordingly, improvements in shuttle track systems may be desired.

BRIEF DESCRIPTION OF THE DRAWINGS

FIG. 9 is an exemplary process flow for achieving item throughput in a shuttle track system, in accordance with one or more embodiments of the disclosure.

Figure 1:
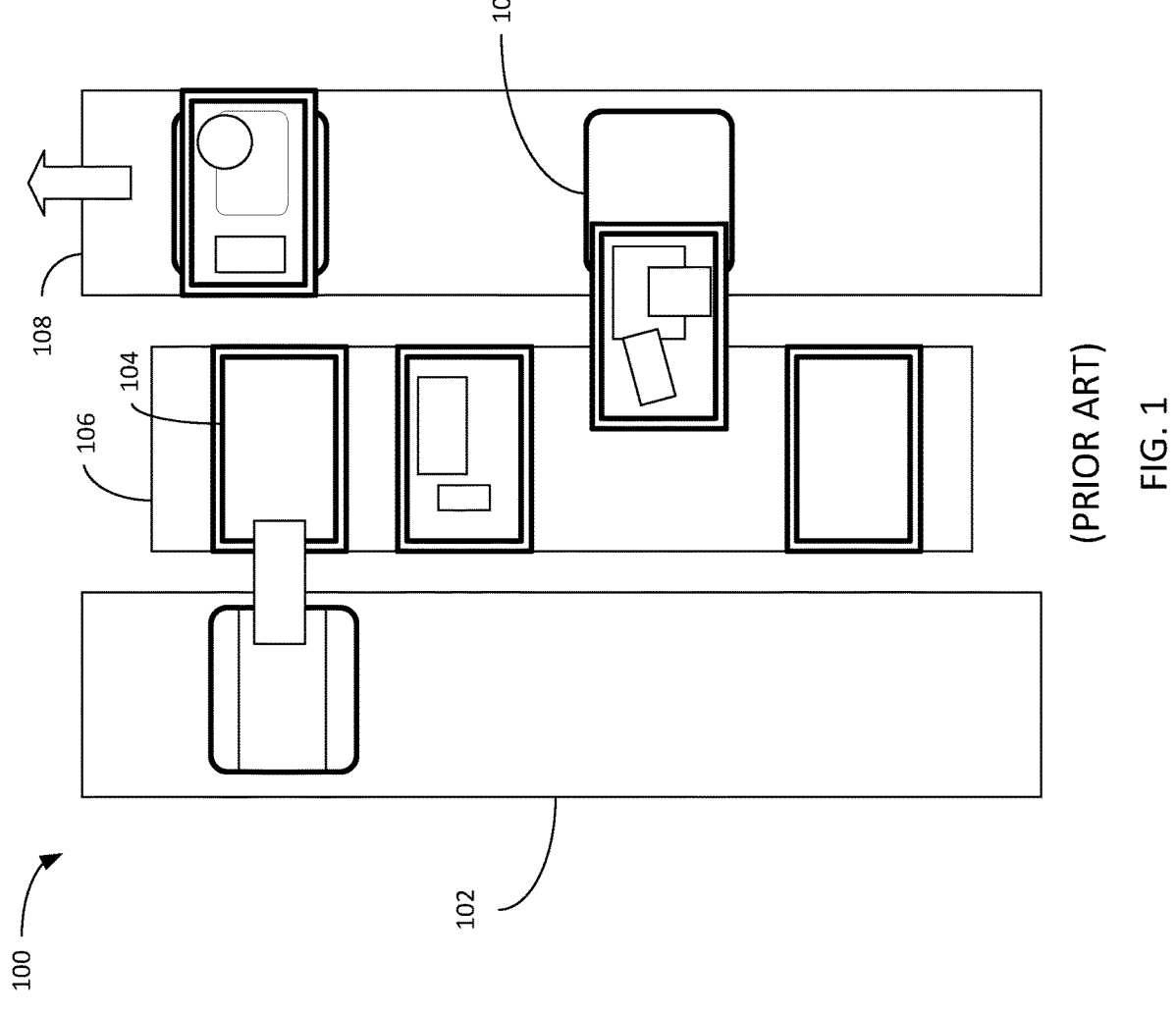
FIG. 1 is a schematic illustration of a shuttle track system with a shuttle track for delivering items, set of totes, and a track with shuttles for moving totes, in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming. It is understood that a fulfillment center may alternatively be a sorting center, transportation center, and/or a shipping or delivery center.

To efficiently and safely sort products and/or items in such a facility, a shuttle track system is provided herein with high item throughput for more efficiently filling totes with items. The shuttle track system may include interconnected shuttle tracks including an electromagnetic propulsion system such as a linear synchronous motor (LSM) system, though other suitable propulsion system may be used. Shuttles may include magnetic portions that may interact with the linear synchronous motors, which may propel the shuttles along the track. Shuttles may transport items (e.g., packages, products, pouches, bags, items, etc.) and deposit such items into totes (e.g., bins or containers) for sorting and/or otherwise fulfilling orders.

To efficiently sort items and packages, shuttle tracks designated for shuttles that transport items (e.g., an item track) may be positioned next to a tote track designed for shuttles that transport totes (e.g., each a tote track). Tote receiving areas which may support totes for receiving the items may be positioned between each item track and tote track. Shuttles designed to transport items (e.g., item shuttles) may deliver items to the totes in the tote receiving areas via the item tracks and shuttles designed to retrieve and/or receive totes (e.g., tote shuttles) may retrieve and/or receive totes via the tote tracks. With multiple item tracks, totes may be loaded more efficiently.

Figure 2:
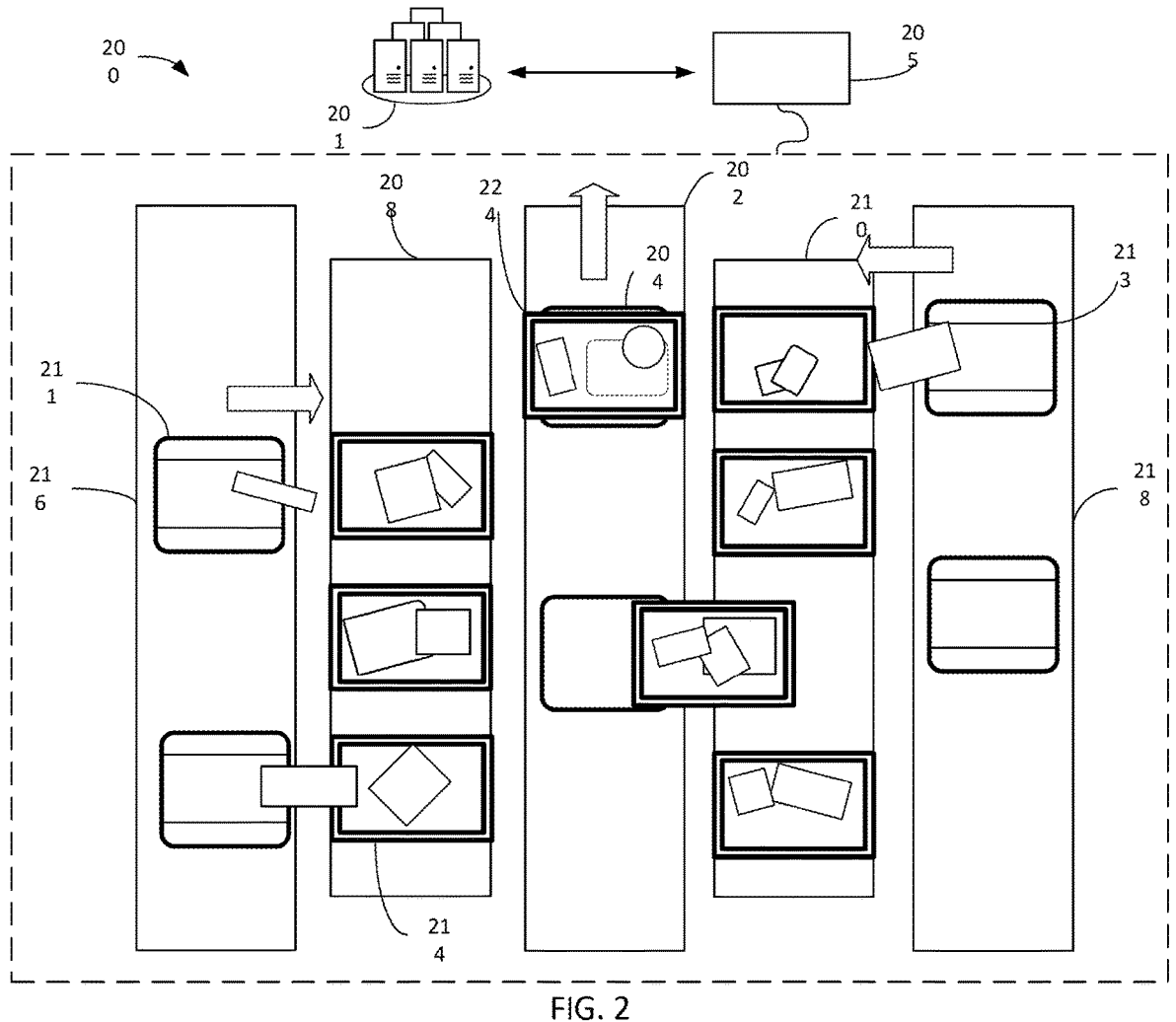
FIG. 2 is a schematic illustration of a shuttle track system including an first and second items tracks adjacent tote receiving areas and a tote track between the tote receiving areas, in accordance with one or more embodiments of the disclosure.

Referring now to FIG. 2, a schematic illustration of a shuttle track system including an tote track with tote receiving areas and items tracks on either side is depicted, in accordance with one or more embodiments of the disclosure. As shown in FIG. 2, shuttle track system 200 may include tote track 202, tote receiving area 208, tote receiving area 210, item track 216 and item track 218 as well as controller 205 and remote device 201. Shuttle track system 200 may be used for sorting items. For example, item shuttles may collect items corresponding to an order and may deposit the items for a single order into the same tote for shipping and delivery.

Tote track 202, tote receiving area 208, tote receiving area 210, item track 216 and/or item track 218 may be controlled by one or more controllers (e.g., controllers 205) which may, for example, have a wired or wireless connection (e.g., Bluetooth, Bluetooth Low Energy (BLE), near field communication protocol, Wi-Fi, cellular network, etc.) with item track 202, tote receiving area 208, tote receiving area 210, tote track 218 and/or tote track 218. Controller 205 may be any computing device having a processor and memory and designed to control shuttles and/or one or linear synchronous motors (LSMs) or other propulsion system to move shuttles about shuttle track system 200.

Remote device 201 may oversee operation of all or a part of the shuttle track system and may communicate with controller 205 via any suitable wired or wireless connection (e.g., Bluetooth, Bluetooth Low Energy (BLE), near field communication protocol, Wi-Fi, cellular network, etc.). Remote device 201 may be any computing device having a processor and memory (e.g., one or more remote server, datastore, controller, and the like).

As shown in FIG. 2, tote track 202 may be positioned between items tracks and tote receiving areas. As item shuttles may only transport a single item or a small number of items, and totes typically are filled with multiple items, requiring multiple item shuttles to fill the tote, more shuttles may traverse the item tracks than the tote track. For this reason, shuttle track system 200 of FIG. 2 has more item tracks with a higher throughput of item shuttles than tote shuttles. To optimize the higher throughput shuttles on an item track may feed items into totes in tote receiving areas on either side of the tote track and. With more item tracks than tote tracks, the item throughput may be increased as compared to shuttle track system of FIG. 1.

As shown in FIG. 2, item tracks 216 and 218 may transport shuttles 211 and 213 which may eject or otherwise deposit items into totes (e.g., totes 212) waiting in tote receiving areas (e.g., tote receiving areas 210 and 208) which may be positioned directly adjacent to item tracks 216 and 218. Item shuttles 211 and 213 may include conveyors or other actuators to deposit such items, for example. Tote shuttles (e.g., tote shuttle 204) may be positioned along tote track 202 adjacent to totes in tote receiving areas (e.g., tote receiving areas 208 and/or 210).

In one example, when a tote is fully loaded (e.g., when a certain tote has loaded all of the items for which are destined for the given tote), controller 205 and/or remote device 201 may cause a tote shuttle to receive such tote. For example, tote shuttle 204 may receive tote 224 on tote 204. In one example, an actuator of shuttle track system 200 (e.g., an actuator in the tote receiving area such as a conveyor upon which the tote is positioned) may cause the tote to move onto the tote shuttle to load the tote shuttle with the tote. It is understood that the tote shuttle may similarly have an actuator (e.g., conveyor).

Figure 3:
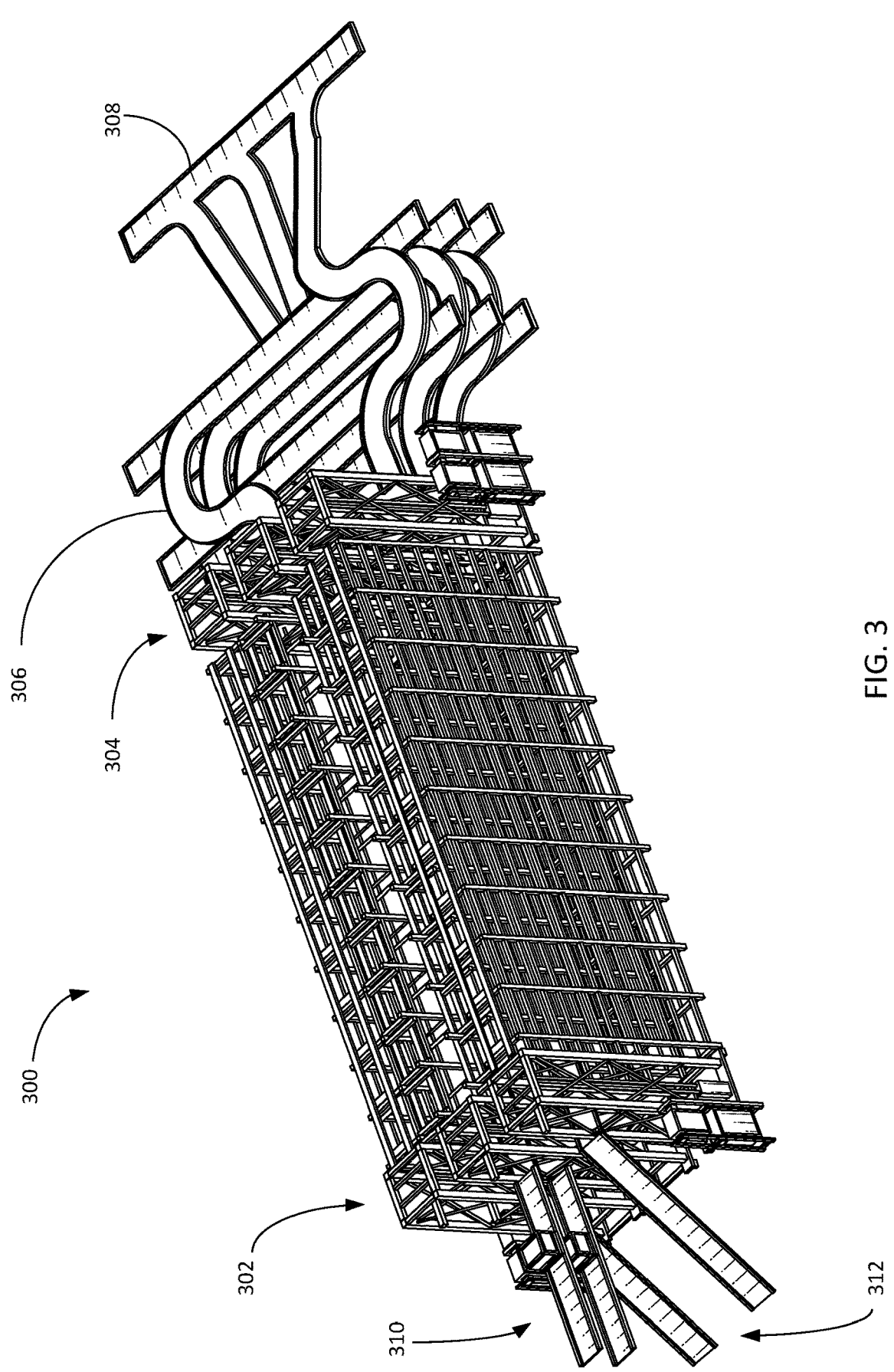
FIG. 3 is a schematic illustration a multilevel shuttle track system, in accordance with one or more embodiments of the disclosure.

Referring now to FIG. 3, is a schematic illustration a multilevel shuttle track system is illustrated, in accordance with one or more example embodiments of the disclosure. As shown in FIG. 3, multilevel shuttle track system 300 may be include multiple levels similar to shuttle track system 200 of FIG. 2, with an tote track positioned between tote receiving areas with items tracks adjacent to each tote receiving area. Shuttle lifts 302 and 304 may be positioned at a beginning and/or an end of the tote track for moving tote shuttles.

Multilevel shuttle track system 300 may further be connected to ramps 306 which may route the shuttles to various tracks throughout the fulfillment center and/or may spiral between levels permitting shuttles to move between levels of multilevel shuttle track system 300. For example, ramps 306 may efficiently move item shuttles to item tracks. Ramps 306 may also optionally connect to induction area 308 which may be used for sorting and/or routing purposes. It is understood that ramps 306 may only connect to certain levels (e.g., lower levels) of multilevel shuttle track system 300.

Item tracks and/or tote tracks may extend from multi-level shuttle track system 300 to other areas of the fulfillment center (e.g., via ramps 312). For example, item and/or tote tracks may extend via ramps 312 and/or track extensions 310 from upper levels of multi-level shuttle track system 300 to other upper levels of the fulfillment center. For example, ramps 312 may extend from the floor of the fulfillment center to upper levels of multi-level shuttle track system 300.

Figure 4:
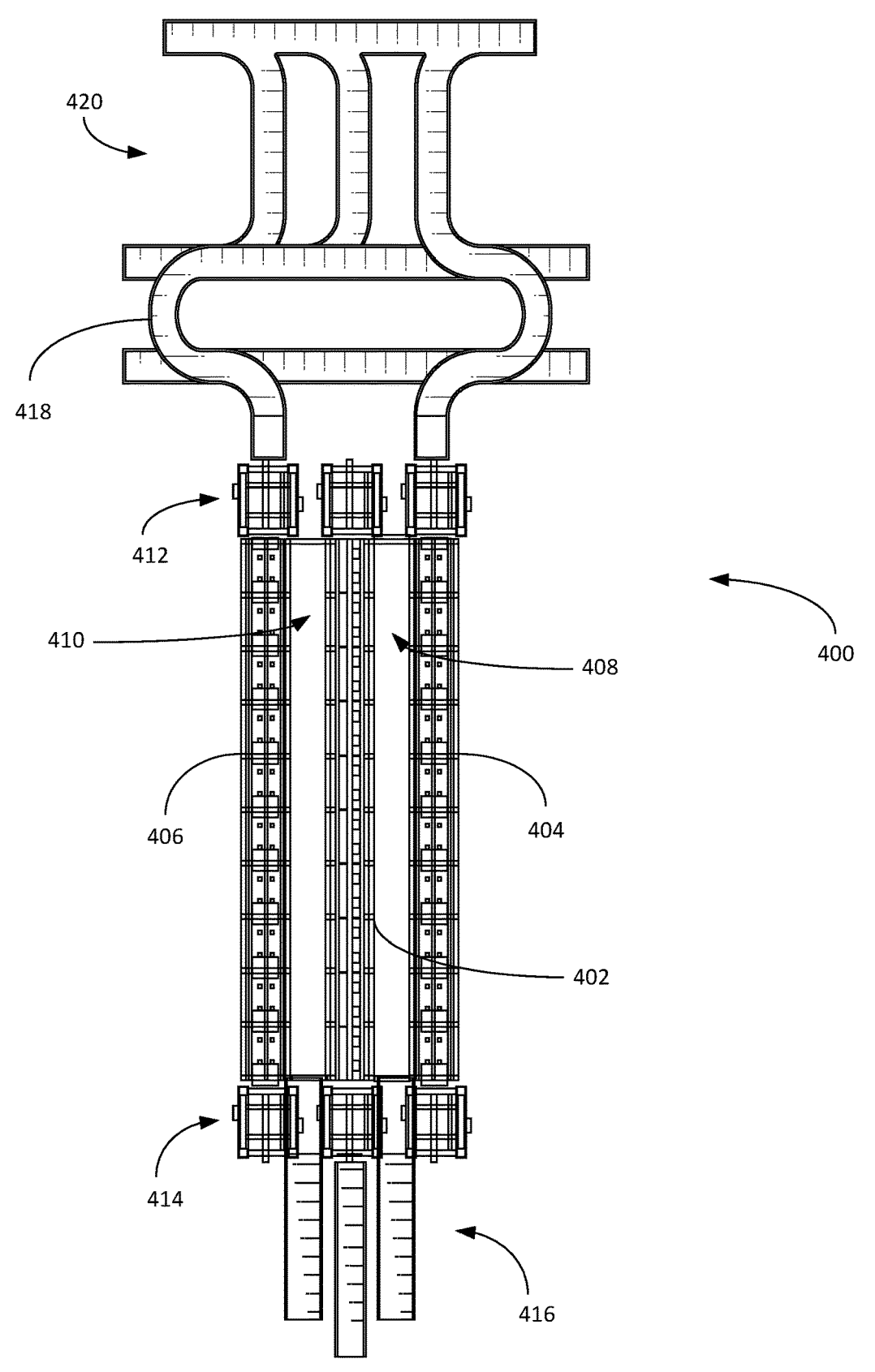
FIG. 4 is a top down view of the multilevel shuttle track system, in accordance with one or more example embodiments of the disclosure.

Referring now to FIG. 4, a top down view of the multi-level shuttle track system is depicted, in accordance with one or more example embodiments of the disclosure. Multilevel shuttle track system 400 may be the same as or similar to multilevel shuttle track system 300 of FIG. 3. Specifically, Multilevel shuttle track system 400 may include tote track 402 positioned between tote receiving areas 408 and 410 which may be adjacent to item tracks 404 and 406, respectively.

Shuttle lift systems 412 and 414, which may lift tote shuttles, may be positioned at either end of the tote and/or item tracks. Ramps 418 may extend from the item tracks and connect the item tracks to induction area 420 and/or other areas of the fulfillment center. In one example, ramps 416 may connect item track 402, tote receiving areas 410 and/or 408 to the floor or other tracks of the fulfillment center. Ramps may improve the throughput of item shuttles as item shuttles may efficiently move between levels via the ramps, especially compared to slow shuttle lift systems 412 and/or 414.

Figure 5:
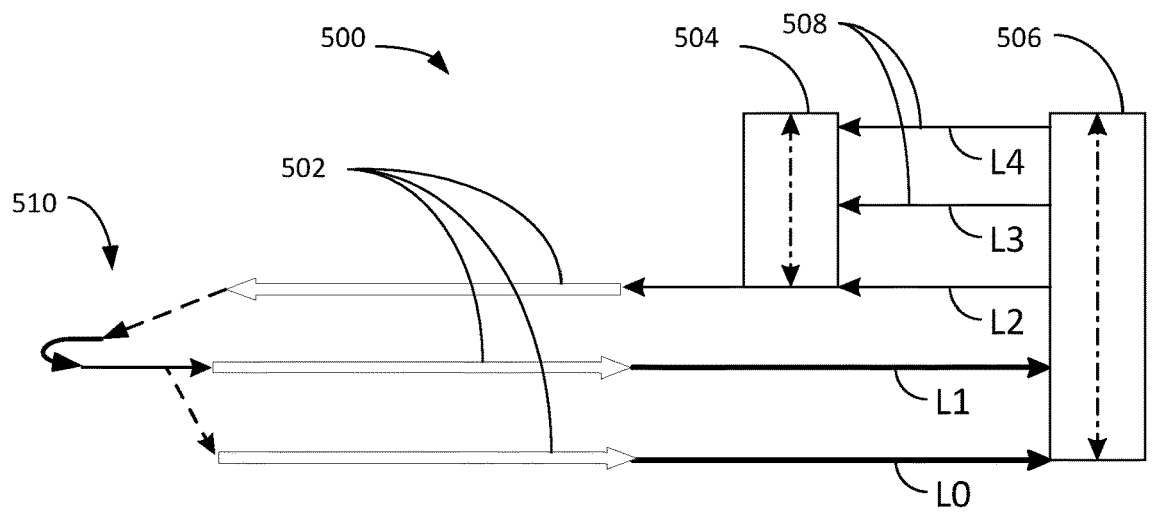
FIG. 5 is a schematic illustration the multilevel shuttle track system including shuttle lifts, in accordance with one or more embodiments of the disclosure.

Referring now to FIG. 5, a schematic illustration the multilevel shuttle track system including shuttle lifts is illustrated, in accordance with one or more embodiments of the disclosure. As shown in FIG. 5, multilevel shuttle system may include sortation levels 502 which may include a tote track adjacent to tote receiving areas that are each adjacent to item tracks. Shuttle lift systems 504 and 506 may connect upper levels 508 to sortation levels 502. Ramps 510 may be the same as ramps 418 of FIG. 4 and may connect to sortation levels 502.

Ramps and/or track extensions similar to ramps 416 of FIG. 4 may also extend form sortation levels 502 to other levels of the fulfillment center including the floor level. In this manner, shuttles may arrive into upper levels 508 and may be transferred via shuttle lifts 504 and/or 506 to sortation levels. Alternatively, shuttles may arrive into sortation levels 502 and may be transferred via shuttle lifts 504 and/or 506 to upper levels 508 and may be guided on extensions or ramps to other upper areas of the fulfillment center.

Figure 6:
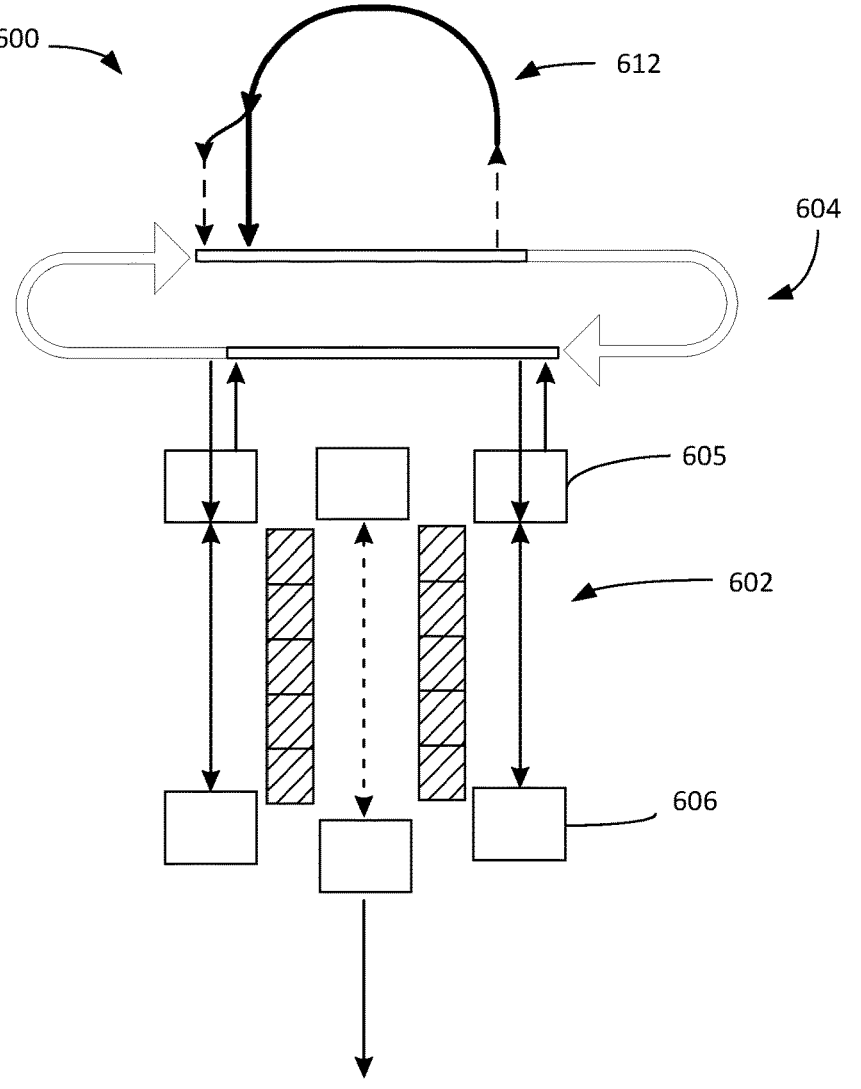
FIG. 6 is a top down view of a schematic illustration of the multi-level shuttle track system including shuttle lifts, in accordance with one or more embodiments of the disclosure.

Referring now to FIG. 6, a top down view of a schematic illustration of the multilevel shuttle track system including shuttle lifts is illustrated, in accordance with one or more embodiments of the disclosure. More specifically, FIG. 6 is a top down view of sortation level 502 of FIG. 5. For example, multilevel shuttle track system 600 may include sortation level 602, which may be connected to shuttle lifts 605 and 606 which may be any suitable lift elevator system for moving shuttles between levels. Shuttles may alternatively move between levels via ramp 604, which may be the same as or similar to ramp 510 of FIG. 5. The ramps and shuttle lifts may be helpful for recirculating shuttles throughout the multilevel shuttle track system. Induction area 612 may also connect to ramps 604 and may be a sorting or induction area, for example.

Figure 7:
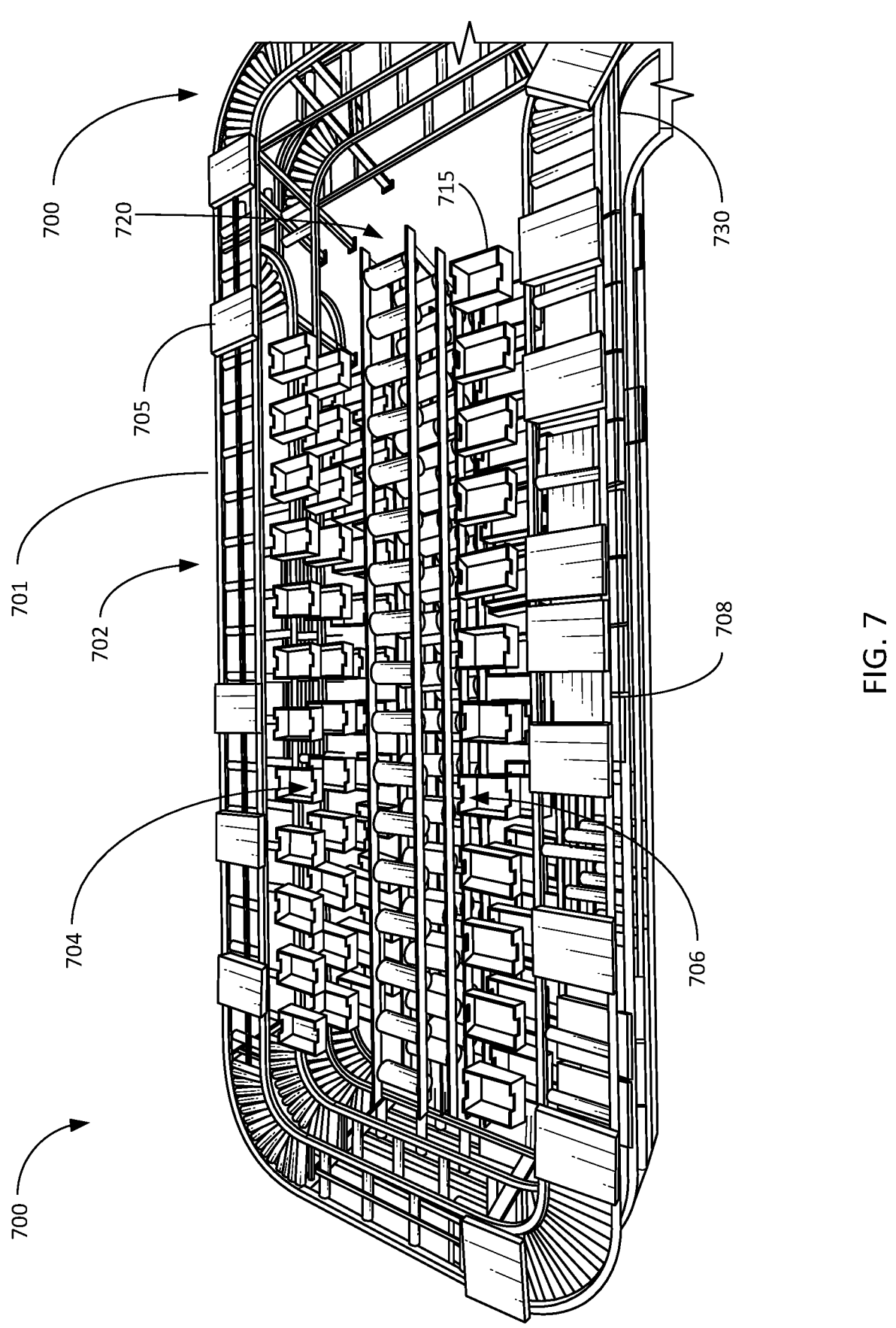
FIG. 7 is a schematic illustration of an alternative multilevel shuttle track system including a tote track with lifts, in accordance with one or more embodiments of the disclosure.

Referring now to FIG. 7, a schematic illustration multilevel shuttle track system including a tote track with lifts is depicted, in accordance with one or more embodiments of the disclosure. For example, multilevel shuttle track system 700 may be similar to multilevel shuttle track system 300, however, the item tracks may be a single item track that curves around the tote track. As shown in FIG. 7, item track 702 may be a single track that may have first linear portion 701 that is curved around tote track 720 to form second linear portion 708.

Item shuttles 705 may traverse item track 702 and may deposit items into totes (e.g., tote 715) in receiving areas 704 and/or 706. Tote track 720 may extend between tote receiving areas 704 and/or 706 and may connect at one or both ends to a shuttle lift system for lifting and lowering the item shuttles. For example, tote shuttles may be lifted to tote track 720 by the shuttle lift, may receive tote 715, which may be fully loaded, and may be lowered by a shuttle lift to another level (e.g. ground floor). All loaded and unloaded item shuttles (e.g., item shuttle 705) may exit item track at output 730.

Figure 8:
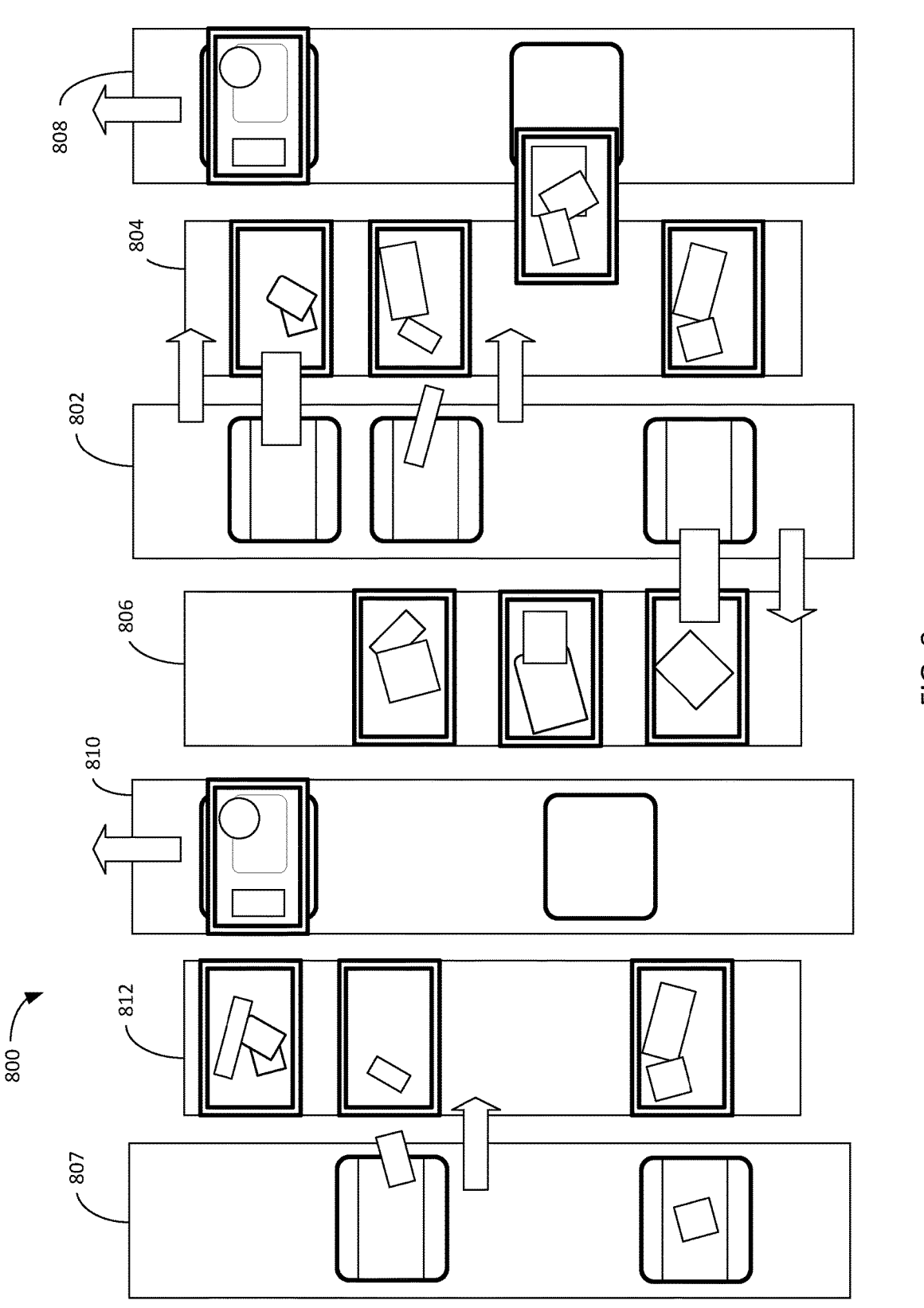
FIG. 8 is a schematic illustration a shuttle track system including alternating item tracks and tote tracks, in accordance with one or more embodiments of the disclosure.

Referring now to FIG. 8, a schematic illustration a shuttle track system including alternating item tracks and tote tracks is depicted, in accordance with one or more embodiments of the disclosure. Shuttle track system 800 may be similar to shuttle track system 200 of FIG. 2, but may include more than one tote track. For example, shuttle track system may include item track 802 and item track 807 as well as tote track 812 and tote track 808. It is understood that an arrangement of alternating item tracks and tote tracks may be used with tote receiving areas positioned between the item tracks and the tote tracks. It may be desirable to have more item tracks to increase item throughput. For example, yet another item track may be positioned to the right of tote track 808.

As shown in FIG. 8, item track 802 may cause item shuttles loaded with items to move down item track 802 and may be positioned between tote receiving areas 806 and 804, each with a set of totes positioned therein. Tote track 810 may be positioned next to both tote receiving area 806 and tote receiving 812. For example, tote track 810 may transport totes loaded with packages from different item tracks as item track 802 may load packages into tote receiving area 806 and item track 807 may load packages into tote receiving area 812.

Referring now to FIG. 9, an exemplary process flow 900 for achieving high item throughput in a shuttle track system is illustrated, in accordance with one or more embodiments of the disclosure, in accordance with one or more embodiments of the disclosure. It is understood that one or more blocks of process flow 900 may be optional and/or may be performed in a different order.

To initiate process flow 900, at block 902 computer-executable instructions stored on a memory of a device, such as a controller and/or a remote computing device, may be executed to determine a certain item is associated with a certain tote. For example, a tote may be used to collect items for a certain purchase order and an item and tote may be associated with that order. At block 904 computer-executable instructions stored on a memory of a device, such as a controller and/or a remote computing device, may be executed to determine the tote is in a certain tote receiving area of a shuttle track system, which may be a multi-level shuttle track system, and may determine a location on the item track adjacent to that certain tote.

At block 906, computer-executable instructions stored on a memory of a device, such as a controller and/or a remote computing device, may be executed to determine another item is associated with a different tote. For example, the second item may be part of a different purchase order. At block 908, computer-executable instructions stored on a memory of a device, such as a controller and/or a remote computing device, may be executed to determine the second tote is in a different tote receiving area on a different side of tote track of the first tote receiving area with the first tote.

At block 910, computer-executable instructions stored on a memory of a device, such as a controller and/or a remote computing device, may be executed to cause an item shuttle to load the first item onto the shuttle and move the first item to a location on a first item track adjacent to the first tote in the first tote receiving area and deposit and/or eject the first item into the first tote. At block 912, computer-executable instructions stored on a memory of a device, such as a controller and/or a remote computing device, may be executed to cause a different item shuttle to load the second item and move the second item to a location on a second item track adjacent to the second tote in the second tote receiving area and deposit and/or eject the second item into the second tote. The first item track and/or second item track may be connected to a ramp for efficiently moving shuttles between levels of the item track.

At block 914, computer-executable instructions stored on a memory of a device, such as a controller and/or a remote computing device, may be executed to determine that a first tote is fully loaded. This determination may be made based on a capacity sensor (e.g., proximity or light sensor) and/or when a certain tote has loaded all of the items for which are destined for the given tote. At block 916, computer-executable instructions stored on a memory of a device, such as a controller and/or a remote computing device, may be executed to cause a first tote shuttle on a tote track to move to a location on the tote track adjacent to the first tote in the first tote receiving area to load the first tote and transport the first tote to a different location (e.g., shipping location).

At block 918, computer-executable instructions stored on a memory of a device, such as a controller and/or a remote computing device, may be executed to determine that a second tote is fully loaded. This determination may be made based on a capacity sensor (e.g., proximity or light sensor) and/or when a certain tote has loaded all of the items for which are destined for the given tote. At block 920, computer-executable instructions stored on a memory of a device, such as a controller and/or a remote computing device, may be executed to cause a second tote shuttle on the tote track to move to a location on a the tote track adjacent to the second tote in the second tote receiving area to load the second tote and transport the second tote to a different location (e.g., shipping location).

Illustrative Computer Architecture

Figure 10:
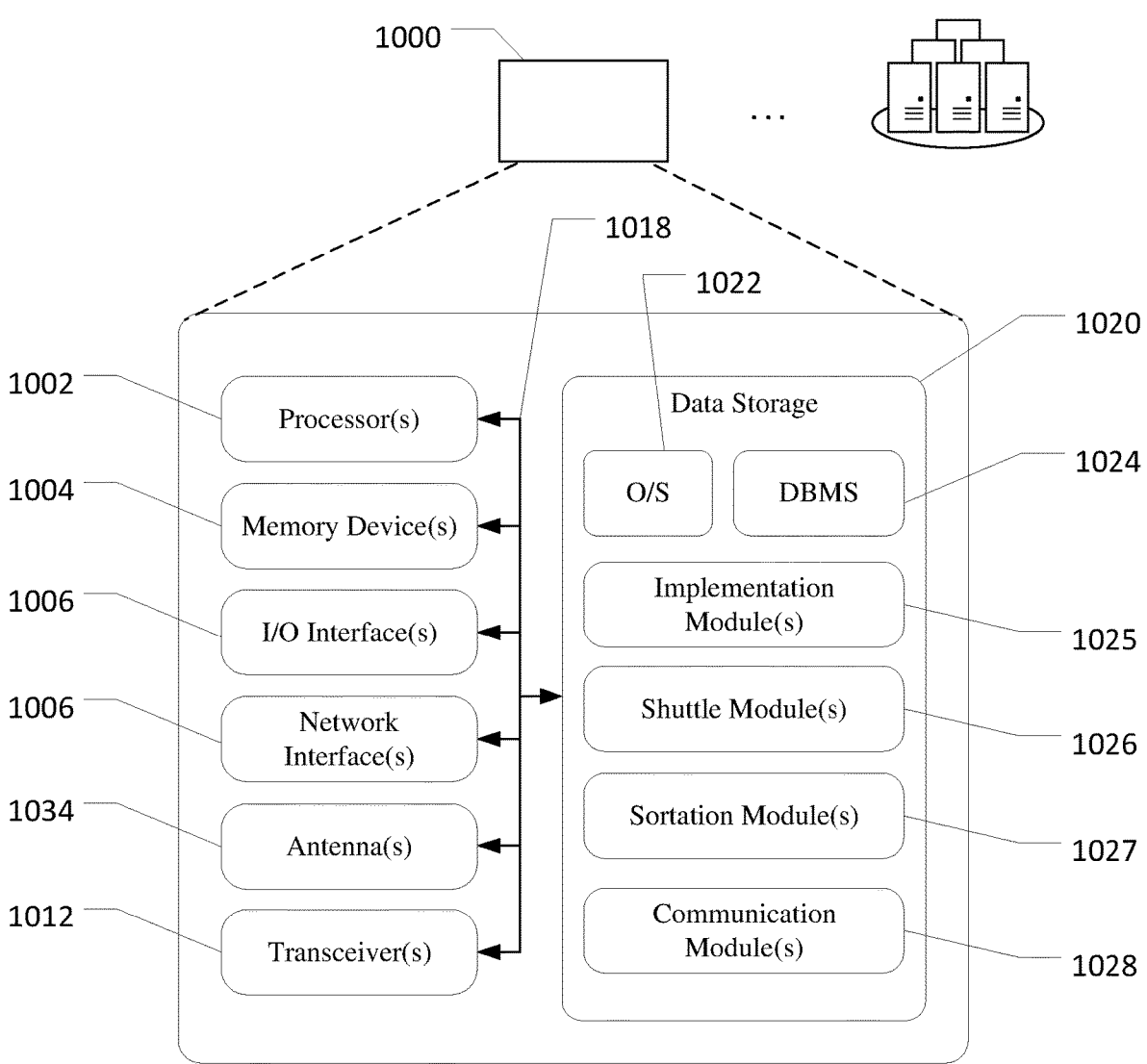
FIG. 10 schematically illustrates an example architecture of a controller for a shuttle track system, in accordance with one or more embodiments of the disclosure.

FIG. 10 is a schematic block diagram of a controller of the shuttle track system for causing item shuttles to deposit items into totes and for causing tote shuttles to load and transport loaded totes. Controller 1000 may be the same as or similar to controller 205, for example. Controller 1000 may optionally be coupled to and/or communicate with devices including, but not limited to, remote devices, shuttles, tracks, computing devices, controllers, and/or one or more servers, or the like. It is understood that the operations described herein may be performed by controller 1000 alone, a remote device alone, or a combination of controller 1000 and one or more remote device.

Controller 1000 may be configured to communicate via one or more networks with one or more servers, computing devices, conveyors, controllers, or the like. Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the controller 1000 may include one or more processors (processor(s)) 1002, one or more memory devices 1004 (generically referred to herein as memory 1004), one or more input/output (I/O) interface (s) 1006, one or more network interface(s) 1008, one or more optional sensors or sensor interface(s), one or more transceivers 1012, one or more optional speakers, one or more optional microphones, and one or more antenna(s) 1034. The controller 1000 may further include one or more buses 1018 that functionally couple various components of the controller 1000. The controller 1000 may further include one or more antenna (e) 1034 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals including BLE signals, a Near Field Communication (NFC) antenna for transmitting or receiving NFC signals, a 900 MHz antenna, and so forth. These various components will be described in more detail hereinafter.

The bus(es) 1018 may include at least one of a system bus, a memory bus, an address bus, or a message bus, and may permit exchange of information (e.g., data (including computer-executable code), signaling, etc.) between various components of the controller 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1004 of the computing device may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to memory 1004 for use by the processor(s) 1002 during the execution of the computer-executable instructions. Moreover, output data generated as a result of execution of the computer-executable instructions by the processor(s) 1002 may be stored initially in memory 1004, and may ultimately be copied to data storage 1020 for non-volatile storage.

More specifically, the data storage 1020 may store one or more operating systems (O/S) 1022; one or more optional database management systems (DBMS) 1024; and one or more implementation module(s) 1025, one or more shuttle module(s) 1026, one or more sortation module(s) 1027, and/or one or more communication module(s) 1028. Some or all of these module(s) may be sub-module(s). Any of the components depicted as being stored in data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in data storage 1020 may support functionality described in reference to correspondingly named components earlier in this disclosure.

The data storage 1020 may further store various types of data utilized by components of the controller 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 10, the datastore(s) may include, for example, user preference information, user contact data, device pairing information, and other information.

The processor(s) 1002 may be configured to access the memory 1004 and execute computer-executable instructions loaded therein. For example, the processor(s) 1002 may be configured to execute computer-executable instructions of the various program module(s), applications, engines, or the like of the controller 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), an application-specific integrated circuit, a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to functionality supported by the various program module(s) depicted in FIG. 10, the implementation module(s) 1025 may include computer-executable instructions, code, or the like that responsive to execution by one or more of the processor(s) 1002 may perform functions including, but not limited to, overseeing coordination and interaction between one or more modules and computer executable instructions in data storage 1020, determining actions and tasks from a remote computing device or controller, determining actions associated with user interactions, determining actions associated with user input, sending and receiving signals and/or data to and from one or more sensors, switches, electromagnets, LSMs, controllers, other computing devices, servers, datastores and the like, initiating commands locally or at remote computing devices and/or controllers, and the like.

Shuttle module 1026 may include computer-executable instructions, code, or the like that responsive to execution by one or more of the processor(s) 1002 may perform functions including, but not limited to determining coordinates or a destination for a shuttle and/or a payload (e.g., item), determining a shuttle location and/or destination and/or causing the shuttles to move on an item track, tote track, shuttle lift, or the like.

Sortation module 1027 may include computer-executable instructions, code, or the like that responsive to execution by one or more of the processor(s) 1002 may perform functions including, but not limited to determining items associated with totes and causing shuttles to move about the shuttle track system to efficiently perform sortation and otherwise fulfill orders.

The communication module(s) 1028 may include computer-executable instructions, code, or the like that responsive to execution by one or more of the processor(s) 1002 may perform functions including, but not limited to, communicating with one or more sensors, controllers, conveyor belts, conveyor systems, for example, via wired or wireless communication, communicating with electronic devices, communicating with one or more computing devices, servers (e.g., remote servers), communicating with remote datastores and/or databases, sending or receiving notifications or commands/directives, communicating with cache memory data, and the like.

Referring now to other illustrative components depicted as being stored in the data storage 1020, the O/S 1022 may be loaded from the data storage 1020 into the memory 1004 and may provide an interface between other application software executing on the controller 1000 and hardware resources of the controller 1000. More specifically, the O/S 1022 may include a set of computer-executable instructions for managing hardware resources of the computing device 1000 and for providing common services to other application programs (e.g., managing memory allocation among various application programs). In certain example embodiments, the O/S 1022 may control execution of the other program module(s) to for content rendering. The O/S 1022 may include any operating system now known or which may be developed in the future including, but not limited to, any server operating system, any mainframe operating system, or any other proprietary or non-proprietary operating system.

The optional DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. As the controller 1000 is a mobile electronic device, the DBMS 1024 may be any suitable light-weight DBMS optimized for performance on a mobile device.

Referring now to other illustrative components of the controller 1000, the optional input/output (I/O) interface(s) 1006 may facilitate the receipt of input information by the controller 1000 from one or more I/O devices as well as the output of information from the controller 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the controller 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), Fire Wire, Thunderbolt, Ethernet port or other connection protocol that may connect to one or more networks. The I/O interface(s) 1006 may also include a connection to one or more of the antenna (e) 1034 to connect to one or more networks via a wireless local area network (WLAN) (such as Wi-Fi®) radio, Bluetooth, Zig-Bee, and/or a wireless network radio, such as a radio capable of communication with a wireless communication network such as a Long Term Evolution (LTE) network, WiMAX network, 3G network, ZigBee network, etc.

The controller 1000 may further include one or more network interface(s) 1008 via which the controller 1000 may communicate with any of a variety of other systems, platforms, networks, devices, and so forth. The network interface(s) 1008 may enable communication, for example, with one or more wireless routers, one or more host servers, one or more web servers, and the like via one or more networks.

The antenna (e) 1034 may include any suitable type of antenna depending, for example, on the communications protocols used to transmit or receive signals via the antenna (e) 1034. Non-limiting examples of suitable antennas may include directional antennas, non-directional antennas, dipole antennas, folded dipole antennas, patch antennas, multiple-input multiple-output (MIMO) antennas, or the like. The antenna (c) 1034 may be communicatively coupled to one or more transceivers 1012 or radio components to which or from which signals may be transmitted or received.

As previously described, the antenna (e) 1034 may include a Bluetooth antenna configured to transmit or receive signals in accordance with established standards and protocols, such as Bluetooth and/or BLE. Alternatively, or in addition to, antenna (e) 1034 may include cellular antenna configured to transmit or receive signals in accordance with established standards and protocols, such as or cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like. The antenna (e) 1034 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11 g, 802.11n), 5 GHZ channels (e.g., 802.11n, 802.11ac), or 60 GHz channels (e.g., 802.11ad). In alternative example embodiments, the antenna (e) 1034 may be configured to transmit or receive radio frequency signals within any suitable frequency range forming part of the unlicensed portion of the radio spectrum (e.g., 900 MHz).

The antenna (e) 1034 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna (c) 1034—transmitting or receiving radio frequency (RF) signals in the bandwidth and/or channels corresponding to the communications protocols utilized by the controller 1000 to communicate with other devices. The transceiver(s) 1012 may include hardware, software, and/or firmware for modulating, transmitting, or receiving—potentially in cooperation with any of antenna (e) 1034—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the controller 1000. The transceiver(s) 1012 may further include a low noise amplifier (LNA), additional signal amplifiers, an analog-to-digital (A/D) converter, one or more buffers, a digital baseband, or the like.

The optional sensor(s)/sensor interface(s) 1 may include or may be capable of interfacing with any suitable type of sensing device such as, for example, inertial sensors (e.g., motion sensor(s)), force sensors, thermal sensors, and so forth. Example types of inertial sensors may include accelerometers (e.g., MEMS-based accelerometers), gyroscopes, and so forth. Sensor(s)/sensor interface(s) may additionally, or alternatively, include health related sensors such as electrocardiogram (ECG) sensors, glucose sensors, heartrate sensors, temperature sensors, and the like. The optional speaker(s) may be any device configured to generate audible sound. The optional microphone(s) may be any device configured to receive analog sound input or voice data, and may include noise cancellation functionality.

It should be appreciated that the program module(s), applications, computer-executable instructions, code, or the like depicted in FIG. 10 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the controller 1000 and/or hosted on other computing device(s) accessible via one or more networks, may be provided to support functionality provided by the program module(s), applications, or computer-executable code depicted in FIG. 10 and/or additional or alternate functionality. Further, functionality may be modularized differently such that processing described as being supported collectively by the collection of program module(s) depicted in FIG. 10 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 10 may be implemented, at least partially, in hardware and/or firmware across any number of devices.

It should further be appreciated that the controller 1000 may include alternate and/or additional hardware, software, or firmware components beyond those described or depicted without departing from the scope of the disclosure. More particularly, it should be appreciated that software, firmware, or hardware components depicted as forming part of the controller 1000 are merely illustrative and that some components may not be present or additional components may be provided in various embodiments. While various illustrative program module(s) have been depicted and described as software module(s) stored in data storage 1020 it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for case of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more exemplary embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:
1. A system comprising:
   a first item shuttle configured to support and eject a first item;
   a second item shuttle configured to support and eject a second item;
   a first item track, the first item track configured to support the first item shuttle;
   a second item track, the second item track configured to support the second item shuttle
   a first tote receiving area configured to receive first totes including a first tote and positioned adjacent to the first item track;
   a second tote receiving area configured to receive second totes including a second tote and positioned adjacent to the second item track;
   a first tote shuttle configured to receive and support the first tote;
   a second tote configured to receive and support the second tote;
   a tote track adjacent to and between the first tote receiving area and the second tote receiving area, the tote track configured to support the first tote shuttle and the second tote shuttle;
   memory configured to store computer-executable instructions; and
   at least one computer processor configured to access the memory and execute computer-executable instructions to:
      cause the first item shuttle loaded with the first item to move to a first location on the first item track adjacent to the first tote in the first tote receiving area;
      cause the first item shuttle to eject the first item into the first tote;
      cause the second item shuttle loaded with the second item to move to a second location on the second item track adjacent to the second tote in the second in the tote receiving area;
      cause the second item shuttle to eject the second item into the second tote;

cause the first tote shuttle to move to a third location on the tote track adjacent to the first tote in the first tote receiving area;
      cause the first tote shuttle to receive the first tote from the first tote receiving area; and
      cause the first tote shuttle to move to a third location on the tote track.
2. The system of claim 1, wherein the at least one computer processor is further configured to access the memory and execute computer executable instructions to:
   cause the second tote shuttle to move to a fourth location on the tote track adjacent to the second tote in the second tote receiving area;
   cause the second tote shuttle to receive the second tote from the second tote receiving area; and
   cause the second tote shuttle to move to a fifth location on the tote track.
3. The system of claim 1, wherein the first item shuttle has a magnetic portion and the first item track has a linear synchronous motor configured to interface with the magnetic portion to cause the first item shuttle to move along the first item track.
4. The system of claim 1, further comprising:
   a tote shuttle lift positioned at an end of the tote track and configured to move the first tote shuttle from a first height to a second height of the tote track; and
   a ramp positioned at an end of the first item track and configured to move the first item shuttle from a third height to a fourth height of the first item track.
5. A system comprising:
   a first item track configured to support a first shuttle configured to transport and eject a first item;
   a second item track configured to support a second shuttle configured to transport and eject a second item;
   a first tote receiving area configured to receive a set of first totes including a first tote and positioned adjacent to the first item track;
   a second tote receiving area configured to receive a set of second totes including a second tote and positioned adjacent to the second item track;
   a tote track adjacent to and between the first tote receiving area and the second tote receiving area, the tote track configured to support a third shuttle configured to receive and transport totes;
   memory configured to store computer-executable instructions; and
   at least one computer processor configured to access the memory and execute computer-executable instructions to:
      cause the first shuttle loaded with the first item to move to a first location on the first item track adjacent the first tote and eject the first item into the first tote; and
      cause the third shuttle to move to a second location on the tote track adjacent the first tote and receive the first tote.
6. The system of claim 5, wherein the at least one computer processor is further configured to access the memory and execute the computer-executable instructions to:
   cause the second shuttle loaded with the second item to move to a third location on the second item track adjacent to a second tote in the second tote receiving area; and
   cause the second shuttle to eject the second item into the second tote.

7. The system of claim 5, wherein the at least one computer processor is further configured to access the memory and execute the computer-executable instructions to:

determine the first tote is fully loaded;

cause the third shuttle loaded with the first tote to move to a third location on the tote track.

8. The system of claim 5, wherein the at least one computer processor is further configured to access the memory and execute the computer-executable instructions to:

determine the second tote is fully loaded;

cause a fourth shuttle to move to a fourth location on the tote track adjacent to the second tote in the second tote receiving area;

cause the fourth shuttle to receive the second tote from the second tote receiving area; and cause the fourth shuttle loaded with the second tote to move to a fifth location on the tote track.

9. The system of claim 5, wherein the first shuttle has a magnetic portion and the first item track has a linear synchronous motor configured to interface with the magnetic portion to cause the first shuttle move along the first item track.

10. The system of claim 5, further comprising:

a third item track configured to support the first shuttle and positioned above the item track;

a fourth item track configured to support the second shuttle and positioned above the second item track;

a third tote receiving area configured to receive a set of third totes, the third tote receiving area positioned above the first tote receiving area;

a fourth tote receiving area configured to receive a set of fourth totes, the fourth tote receiving area positioned above the second tote receiving area; and a second tote track configured to support the third shuttle and positioned above the tote track.

11. The system of claim 5, further comprising:

a third item track configured to support the first shuttle and positioned below the item track;

a fourth item track configured to support the second shuttle and positioned below the second item track;

a third tote receiving area configured to receive a set of third totes, the third tote receiving area positioned below the first tote receiving area;

a fourth tote receiving area configured to receive a set of fourth totes, the fourth tote receiving area positioned below the second tote receiving area; and a second tote track configured to support the third shuttle and positioned below the tote track.

12. The system of claim 5, further comprising:

a tote shuttle lift positioned at an end of the tote track and configured to move the third shuttle from a first height to a second height of the tote track; and a ramp positioned at an end of the first item track and configured to move the first shuttle from a third height to a fourth height of the first item track.

13. A method comprising:

causing, by a controller, a first shuttle loaded with a first item to move to a first location on a first item track adjacent to a first tote in a first tote receiving area adjacent the first item track;

causing the first shuttle to eject the first item into the first tote;

causing a second shuttle loaded with a second item to move to a second location on a second item track adjacent to a second tote in a second tote receiving area adjacent the second item track;

causing the second shuttle to eject the second item into second first tote;

causing a third shuttle to move to a third location on a tote track between the first tote receiving area and the second tote receiving area, the third location adjacent the first tote;

causing the third shuttle to receive the first tote from the first tote receiving area; and causing the third shuttle to move to a third location on the tote track after the first tote is received by the third shuttle.

14. The method of claim 13, further comprising:

causing a fourth shuttle loaded with a third item to move to the first location on the first item track adjacent to the first tote in a first tote receiving area;

causing the third shuttle to eject a third item into first tote.

15. The method of claim 13, further comprising:

causing a fourth shuttle to move to a fourth location on the tote track adjacent to the second tote in the second tote receiving area;

causing the fourth shuttle to receive the second tote from the second tote receiving area; and causing the fourth shuttle to move to a fifth location on the tote track after the second tote is received by fourth shuttle.

16. The method of claim 14, wherein the second tote receiving area is positioned between the second item track and the tote track.

17. The method of claim 13, further comprising determining the first tote is fully loaded before causing the third shuttle to receive the first tote from the first tote receiving area.

18. The method of claim 13, wherein the first shuttle has a magnetic portion and the first item track has a linear synchronous motor configured to interface with the magnetic portion to cause the first shuttle move along the first item track.

19. The method of claim 13, further comprising causing a shuttle lift at a first end of the tote track to move the third shuttle from a first height to a second height of the tote track.

20. The method of claim 19, further comprising causing the first shuttle to traverse a ramp connected to an end of the first item track and extending between a first height to a second height of the first item track.

* * * * *